United States Patent

[11] 3,629,630

[72] Inventors Herbert John Thomas Cotton
Hollywood;
Robert Hemmings, Halesowen, both of England
[21] Appl. No. 1,644
[22] Filed Jan. 9, 1970
[45] Patented Dec. 21, 1971
[73] Assignee Joseph Lucas (Industries) Limited
Birmingham, England
[32] Priority Jan. 13, 1969
[33] Great Britain
[31] 1,878/69

[54] FULL WAVE RECTIFIER ASSEMBLIES
4 Claims, 4 Drawing Figs.
[52] U.S. Cl. ................................................ 310/68
[51] Int. Cl. ............................................. H02k 11/00
[50] Field of Search ................................. 310/68 R, 68 D, 168, 263, 239, 70

[56] References Cited
UNITED STATES PATENTS
| | | | |
|---|---|---|---|
| 3,361,915 | 1/1968 | Baker | 310/68 R |
| 3,527,971 | 9/1970 | Means | 310/239 X |
| 3,527,972 | 9/1970 | Franz et al. | 310/239 X |

*Primary Examiner*—D. F. Duggan
*Attorney*—Holman & Stern

ABSTRACT: A full wave rectifier assembly for use in an alternator includes first and second curved terminal plates. The first terminal plate carries a set of diodes with their cathodes electrically connected to the first plate, and the second terminal plate carries a second set of diodes with their anodes electrically connected to the second plate. The first and second plates are physically interconnected in insulated relationship when the assembly is mounted in an alternator, and the first and second terminal plates are so shaped that when the first and second plates are interconnected then the diodes lie substantially in the same plane.

FULL WAVE RECTIFIER ASSEMBLIES

This invention relates to full wave rectifier assemblies for use in alternators.

A full wave rectifier assembly according to the invention includes a first conductive terminal plate carrying a first set of diodes with their cathodes electrically connected to the first terminal plate, a second terminal plate carrying a second set of diodes with their anodes electrically connected to the second terminal plate, means for physically interconnecting the first and second terminal plates in insulated relationship, the first and second terminal plates being so shaped that when the terminal plates are physically interconnected then diodes lie substantially in the same plane and constitute pairs of diodes, each pair of diodes comprising a first diode carried by the first terminal plate and a second diode carries by the second terminal plate, the shape of the terminal plates being such that the first and second diodes of each pair of diodes are adjacent one another, the assembly further including conductive connectors, associated with said pairs of diodes respectively, each connector electrically interconnecting the anode of said first diode of the respective pair of diodes to the cathode of said second diode of the respective pair of diodes.

One example of the invention is illustrated in the accompanying drawings wherein.

Figure 1:
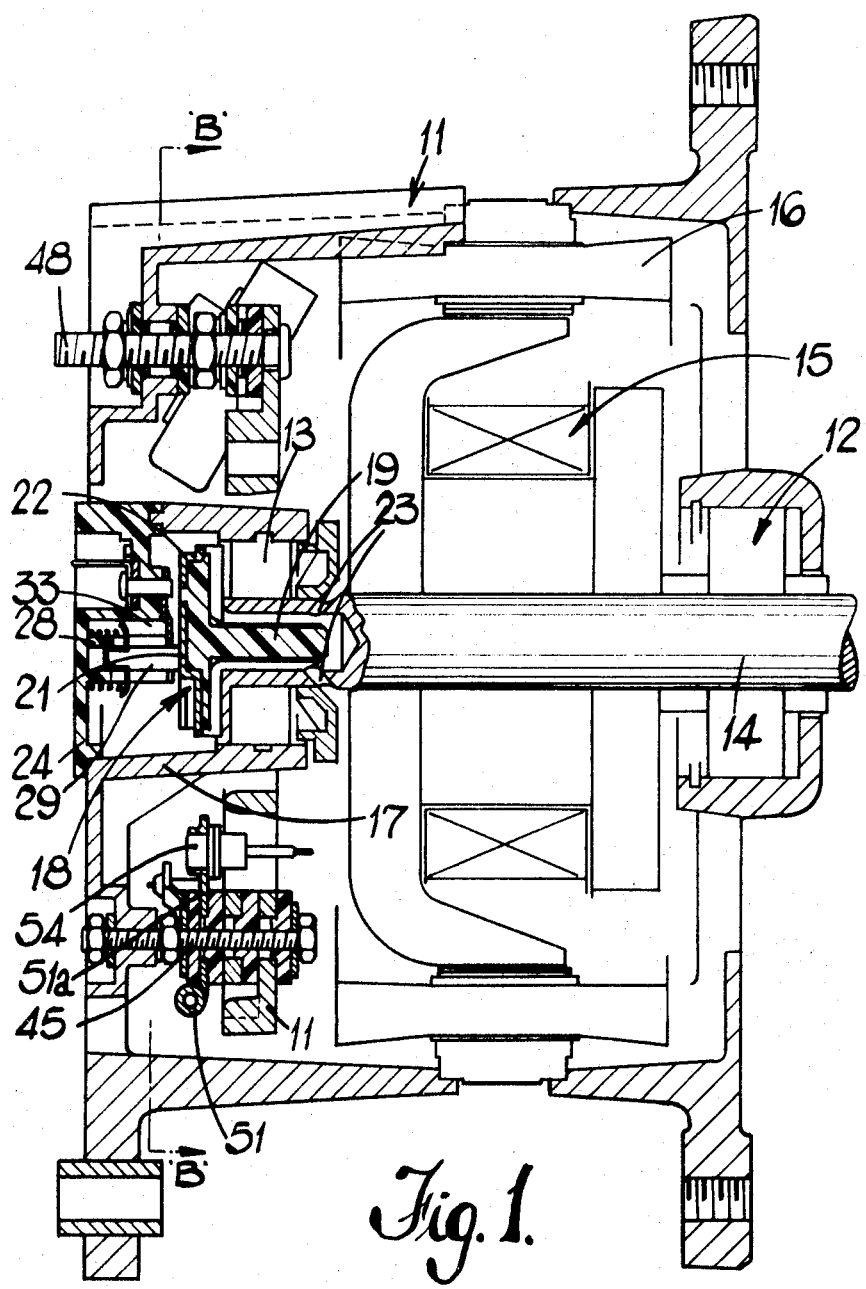
FIG. 1 is a sectional view of an alternator.
Figure 2:
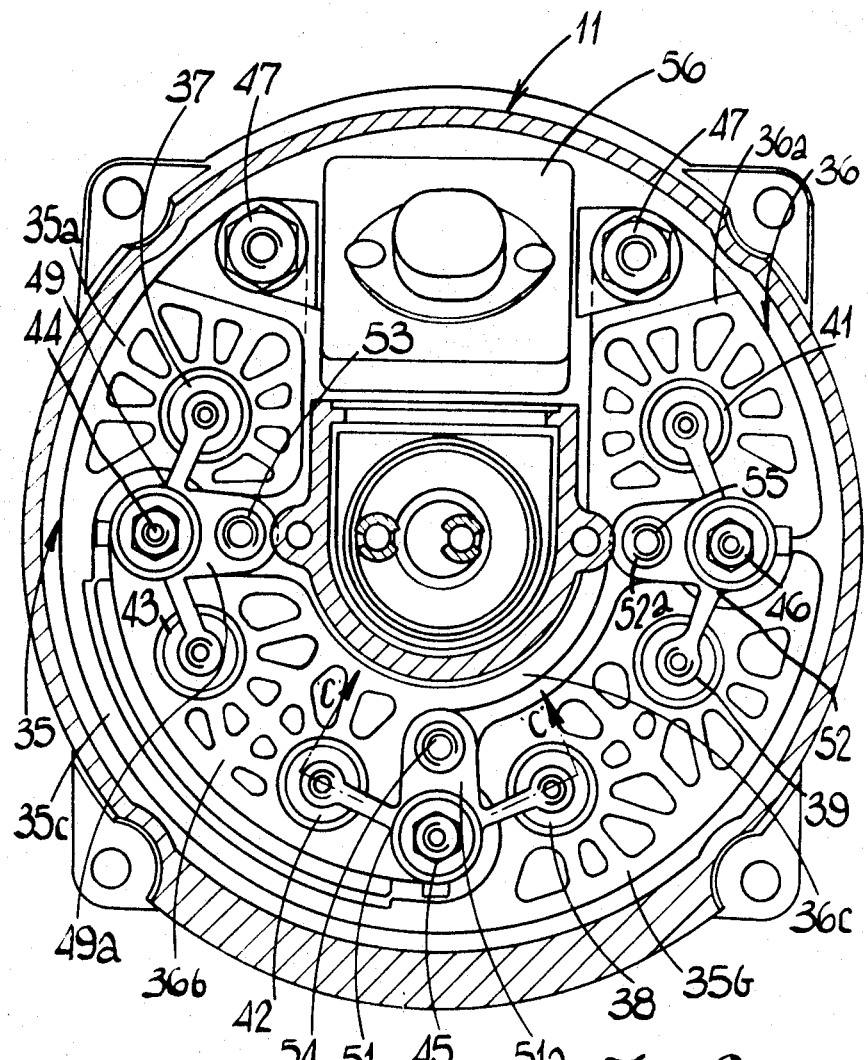
FIG. 2 is a sectional view on the line B—B in FIG. 1.
Figure 3:
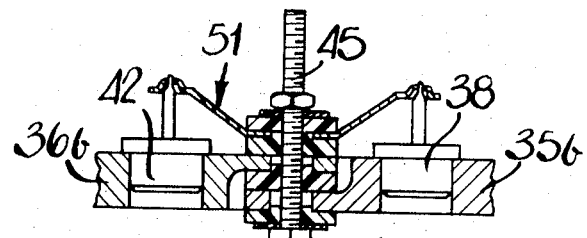
FIG. 3 is a sectional view on the line C—C in FIG. 2.

Referring to the drawings, the alternator includes a frame 11 carrying first and second bearing assemblies 12, 13. Journaled for rotation in the bearing assemblies 12, 13 is a rotor shaft 14 which carries intermediate its ends, between the bearing assemblies 12, 13, a rotor assembly 15. The rotor assembly 15 includes a pair of pole pieces on each side of a core carrying a rotor winding, and the rotor assembly 15 is rotatable with the shaft 14, within a stator assembly 16 carries by the frame 11. The shaft 14 projects at one end from the bearing assembly 12 and is adapted to receive a fan, and a pulley through which the rotor shaft is driven. At its opposite end, the rotor shaft 14 projects from the bearing assembly 13, the rotor shaft 14 terminating within a generally cylindrical portion 17 of the frame 11. The end of the rotor shaft 14 remote from the bearing assembly 12 is formed with a cylindrical bore within which is received a spigot 19 integral with a slip ring unit 18. The slip ring unit 18 includes a moulded body including a plain circular face extending in a plane at right angles to the axis of the shaft 14. Said face of the moulded body of the slip ring unit 18 includes a central conductive disc 21 which lies within a conductive annulus 22, the disc 21 being insulated from the annulus 22. The disc 21 is concentric with the annulus 22, and the disc 21 and the annulus 22 constitute the brush engaging surfaces of the slip ring unit. The spigot 19 of the slip ring unit 18 is of cruciform cross section, and is received as an interference fit in the bore in the rotor shaft 14, so that the slip ring unit 18 rotates with the rotor shaft 14. A spring clip (not shown) is engaged between the spigot 19 and the wall of the bore in the shaft 14, and aids the interference fit between the spigot 19 and the wall of the bore in the shaft 14, in maintaining the slip ring unit 18 in engagement with the shaft 14. Since the bore in the shaft 14 is cylindrical, and the spigot 19 is of cruciform cross section, then four equiangularly spaced passages are defined between the spigot 19 and the wall of the bore shaft 14. A pair of connecting leads are provided for electrically interconnecting the annulus 22 and the disc 21 of the unit 18 to the rotor winding, and these leads extend through the bearing assembly 13 along a diametrically opposite pair of the passages defined between the wall of the bore in the shaft 14 and the spigot 19. At the side of the bearing 13 adjacent the rotor assembly 15, that is to say the side remote from the unit 18, the leads extend through respective passages 23 through which the cylindrical bore in the shaft 14 communicates with the exterior of the shaft.

The provision of a face-type slip ring assembly which is secured to the rotor shaft by engaging a spigot integral with the slip ring assembly in a bore in the shaft enables the overall length of the alternator to be kept to a minimum.

Figure 4:
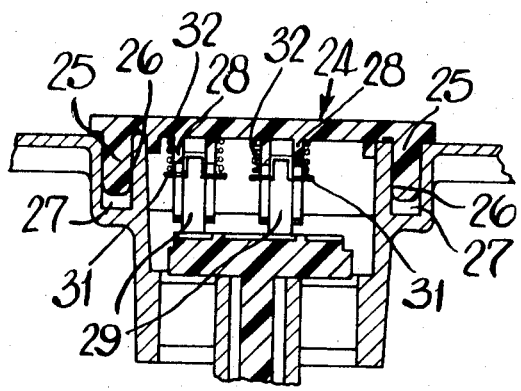
FIG. 4 is a sectional view of the brush assembly shown in FIG. 1.

The inner end of the portion 17 of the frame 11 is closed by the bearing assembly 13, and the outer end of the portion 17 is closed by a moulded synthetic resin brush box 24. The brush box 24 is engaged as an interference fit with the frame 11, the brush box 24 including a pair of spigots 25 which carry spring clips 26 and which are received as a push fit in corresponding bores 27 in the frame 11 adjacent the portion 17 of the frame 11 (FIG. 4). The brush box 24 includes a pair of integral hollow spigots 28 which extend towards the slip ring unit 18, and which receive respective brushes 29. The brushes 29 include respective conductive carriers 31 which extend through slots in the walls of the spigots 28 and which serve to guide the brushes 29 for sliding movement in the spigots 28. The brushes are urged into engagement with the annulus 22 and the disc 21 of the slip ring unit 18 respectively, by respective compression springs 32 which act between the carriers 31 and the brush box 24. Each of the carriers 31 has electrically connected thereto a conductive braid 33 which is electrically connected to a respective terminal secured to the exterior of the brush box 24. Thus, the slip ring unit and brushes of the alternator are completely enclosed by a housing defined by the bearing assembly 13, the portion 17 of the frame and the brush box 24.

The alternator is a three-phase alternator, and is provided with a full wave rectifier. The full wave rectifier includes a pair of arcuate terminal plates 35, 36 each of which includes a pair of portions indicated by the suffixes $a$ and $b$ which are interconnected by a conductive integral neck indicated by the suffix $c$. The plates 35, 36 are arranged with the portion 35$b$ of the plate 35 between the portions 36$a$, 36$b$ of the plate 36, and the portion 36$b$ of the plate 36 between the portions 35$a$, 35$b$ of the plate 35. The plate 35 carries three diodes 37, 38, 39, with their anodes electrically connected to the plate 35 and in heat exchange relationship therewith. The diode 37 is carried by the portion 35$a$ of the plate 35 while the diodes 38, 39 are carried by the portion 35$b$ of the plate 35. Similarly, the plate 36 carries three diodes 41, 42, 43 with their cathodes electrically connected to the plates 36, and in heat exchange relationship therewith, the diode 41 being carried by the portion 36$a$ of the plate 36 while the diodes 42, 43 are carried by the portion 36$b$ of the plate 36. The portion 36$a$ of the plate 36 includes a lug which overlaps a corresponding lug at one end of the portion 35$b$ of the plate 35, at its opposite end the portion 35$b$ of the plate 35 includes a lug which overlaps a corresponding lug at one end of the portion 36$b$ of the plate 36, and at its other end the portion 36$b$ of the plate 36 includes a lug which overlaps a corresponding lug on the portion 35$a$ of the plate 35. The plates 35, 36 are secured to one another by means of bolts 44, 45, 46 which extend through the lugs of the plates 35, 36 respectively. The lugs of the plates 35, 36 are insulated from one another by insulating washers, and the bolt 45 is insulated from both of the plates 35, 36. The bolt 45 physically connects the plates 35, 36 to the frame 11 of the alternator and a further pair of bolts 47 connected to but insulated from the plates 35, 36 respectively aid the bolt 45 in securing the plates 35, 36 to the frame 11. The bolt 44 is electrically connected to the plate 35, but insulated from the plate 36, while the bolt 46 is electrically connected to the plate 36 but insulated from the plate 35. Thus, the bolts 44, 46 constitute the positive and negative output terminals of the alternator respectively. Each of the diodes is supported on a part of the respective portion of the plates 35, 36 and is surrounded by passages through which air flows in use to aid cooling of the diodes. The plates 35, 36 are formed from relatively thick material, and so constitute heat sinks for the diodes, and are so shaped that the diodes 37, 38, 39, 41, 42, 43 lie substantially in the same plane.

The full wave rectifier further includes three phase plates 49, 51, 52, each of which is stamped from copper sheet. The phase plates 49, 51, 52 are supported by the bolts 44, 45, 46 respectively and are insulated therefrom. Each of the phase plates includes a center region which is mounted on but insulated from the respective bolts 44, 45, 46 and extending from the central region of each of the phase plates, in opposite directions, is a pair of integral arms. One arm of the phase plate 49 is electrically connected to the cathode of the diode 37, while the other arm of the phase plate 39 is connected to the anode of the diode 43, one arm of the phase plate 51 is electrically connected to the anode of the diode 42, while the other arm thereof is connected to the cathode of the diode 38, and one arm of the phase plate 52 is electrically connected to the cathode of the diode 39 while the other arm thereof is electrically connected to the anode of the diode 41. Moreover, the central region of each of the phase plates 49, 51, 52 includes a terminal which receives a lead whereby the phase plate is electrically connected to the phase winding of the stator of the alternator. Each of the phase plates 49, 51, 52 includes a diode supporting region indicated by the suffix $a$. The regions 49$a$, 51$a$ 52$a$ of the phase plates carry respective field diodes 53, 54, 55 with their anodes electrically connected to the regions 49$a$, 51$a$, 52$a$ respectively.

The bolts 47 further serve to mount a voltage regulator 56 within the confines of the frame 11, and the necessary electrical connections between the terminals of the brushes 29, the cathodes of the field diodes 53, 54, 55 and the voltage regulator 56 are made by way of conductive leads.

It will be appreciated that since the brush box 24 is engaged as a push fit with the frame 11, then it can be easily detached to facilitate replacement of the brushes 29.

Having thus described our invention, what we claim as new and desire to secure by Letters Patent is:

1. A full wave rectifier assembly, for use in a three-phase alternator, comprising, A first arcuate conductive terminal plate having first and second portions spaced apart by an integral neck, first, second and third semiconductor diodes carried by said first terminal plate with their cathodes electrically connected to the plate, said first and second diodes being carried by said first portion and said third diode being carried by said second portion, a second, arcuate conductive terminal plate having first and second portions spaced apart by an integral neck, fourth, fifth, and sixth semiconductor diodes carried by said second terminal plate with their anodes electrically connected to the plate, said fourth and fifth diodes being carried by the first portion of the second plate and said sixth diode being carried by the second portion of the plate, means physically interconnecting said first and second terminal plates in insulated relationship with the first portion of the first terminal plate positioned between the first and second portions of the second terminal plate and the first portion of the second terminal plate positioned between the first and second portions of the first terminal plate, so that the first and sixth diodes are adjacent one another, the second and fifth diodes are adjacent one another, and the third and fourth diodes are adjacent one another, and first, second and third conductive connectors, said conductive connectors electrically interconnecting respectively the anode of the first diode and the cathode of the sixth diode, the anode of the second diode and the cathode of the fifth diode, and the anode of the third diode and the cathode of the fourth diode.

2. An assembly as claimed in claim 1 wherein the regions of the terminal plates around the diodes are perforated to define passages through which cooling air can flow.

3. An assembly as claimed in (any one of the preceding claims) claim 1 wherein each of said first, second and third connectors (each include) includes a region which carries a respective semiconductor diode, the diodes carried by the connectors each having a terminal electrically connected to the respective connector.

4. An assembly as claimed in claim 1 wherein said connectors constitute part of the phase connections to the diodes of the rectifier.

* * * * *